United States Patent [19]

St. Ledger

[11] Patent Number: 4,621,657

[45] Date of Patent: Nov. 11, 1986

[54] AUTOMATIC WATER LEVEL MONITORING SYSTEM

[75] Inventor: Lester A. St. Ledger, Randwick, Australia

[73] Assignee: Roto Moulded Plastics Pty. Limited, New South Wales, Australia

[21] Appl. No.: 821,556

[22] PCT Filed: Apr. 10, 1985

[86] PCT No.: PCT/AU85/00076

§ 371 Date: Dec. 10, 1985

§ 102(e) Date: Dec. 10, 1985

[87] PCT Pub. No.: WO85/04735

PCT Pub. Date: Oct. 24, 1985

[30] Foreign Application Priority Data

Apr. 10, 1984 [AU] Australia ............................ PG4499

[51] Int. Cl.[4] ........................ F16K 31/26; F16K 33/00
[52] U.S. Cl. .................................. 137/426; 137/428; 137/430; 137/432; 137/579; 4/507; 4/508
[58] Field of Search ............ 137/386, 393, 426, 428, 137/430, 432, 563, 577, 579; 4/507, 508, 509

[56] References Cited

U.S. PATENT DOCUMENTS

| | | | |
|---|---|---|---|
| 1,147,800 | 7/1915 | Ihrig | 137/432 |
| 1,626,782 | 5/1927 | Brooks | 137/577 |
| 2,278,000 | 3/1942 | Thompson | 137/430 |
| 2,739,939 | 3/1956 | Leslie | 137/428 |
| 2,767,732 | 10/1956 | Hodgson et al. | 137/426 |
| 2,809,752 | 10/1957 | Leslie | 137/428 UX |
| 3,472,273 | 10/1969 | Perry | 137/430 |
| 3,739,405 | 6/1973 | Schmidt | 137/428 |
| 3,908,206 | 9/1975 | Grewing | 137/428 |
| 4,342,125 | 8/1982 | Hodge | 137/430 |
| 4,373,220 | 2/1983 | Selsted | 137/428 |

*Primary Examiner*—George L. Walton
*Attorney, Agent, or Firm*—Arnold, White & Durkee

[57] ABSTRACT

A system for maintaining a preselected water level in e.g. a swimming pool comprises a chamber (6) in communication with the pool such that the water level in the chamber corresponds to that of the pool. The chamber contains an adjustable over flow tube (15) and a vertically oriented water supply line (19) having a diaphragm valve (20) and surrounded by an annular float (29), the valve being actuated by a height adjustable overhead actuator bar (23).

7 Claims, 3 Drawing Figures

AUTOMATIC WATER LEVEL MONITORING SYSTEM

This invention relates to systems for automatic supervision of water supply to reservoirs, and more particularly to monitoring systems for automatically maintaining a selected water level within a swimming pool, spa, or the like.

BACKGROUND ART

Several attempts have been made to provide an effective monitoring system of this kind which will comply with the stringent requirements of public water authorities regarding cross connection and the minimum height of fresh water inlet valves above spill levels of swimming pools. A breaker tank is generally required which of necessity is of such large proportions as to be difficult to site on domestic premises.

Of course, ball float valves, and similar water level maintaining devices used in other applications such as water cisterns, are well-known but would not be either of sufficiently compact form or readily convertible for compliance with water authority regulations, for use in the instant application. Furthermore, such existing devices do not provide a ready and convenient facility for water level adjustment which should be available to the owner of a domestic swimming pool.

DISCLOSURE OF INVENTION

It is the principal object of the invention to provide a monitoring system for the above purpose which will meet the described requirements of public authorities and is compact and efficient in operation.

To this end the invention in one general form provides a water level monitoring system for a water reservoir such as a swimming pool, comprising a chamber, a water duct for connecting said chamber and said reservoir to establish corresponding water levels therein, adjustable overflow relief means for determining a desired water level for said reservoir, final overflow relief means for said chamber for limiting said water level to a maximum level, a fresh water inlet to said chamber connected by a substantially vertical water line to a diaphragm valve positioned above said maximum water level, an overhead actuator for said valve and an annular float in said chamber encircling at least the extended axis of said water line and supported adjustably in height within said chamber from opposite parts of said actuator to effect opening of said valve by said actuator with falling water level below a predetermined level to add fresh water to the chamber and thus to the reservoir to restore the water level to said predetermined level.

BRIEF DESCRIPTION OF DRAWINGS

The invention will be described in more detail with reference to the accompanying drawings, in which.

BEST MODE OF CARRYING OUT THE INVENTION

Figure 1:
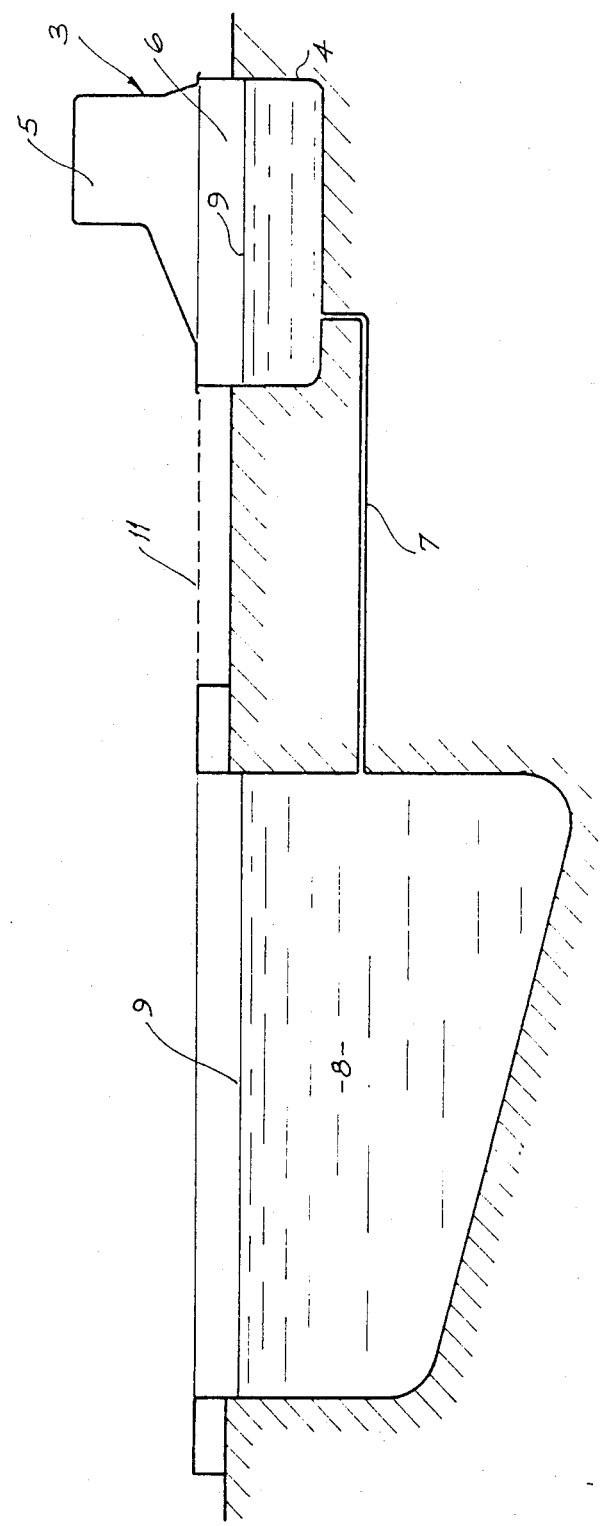
FIG. 1 shows diagramatically a monitoring system of the invention connected to an in-ground domestic swimming pool.
Figure 2:
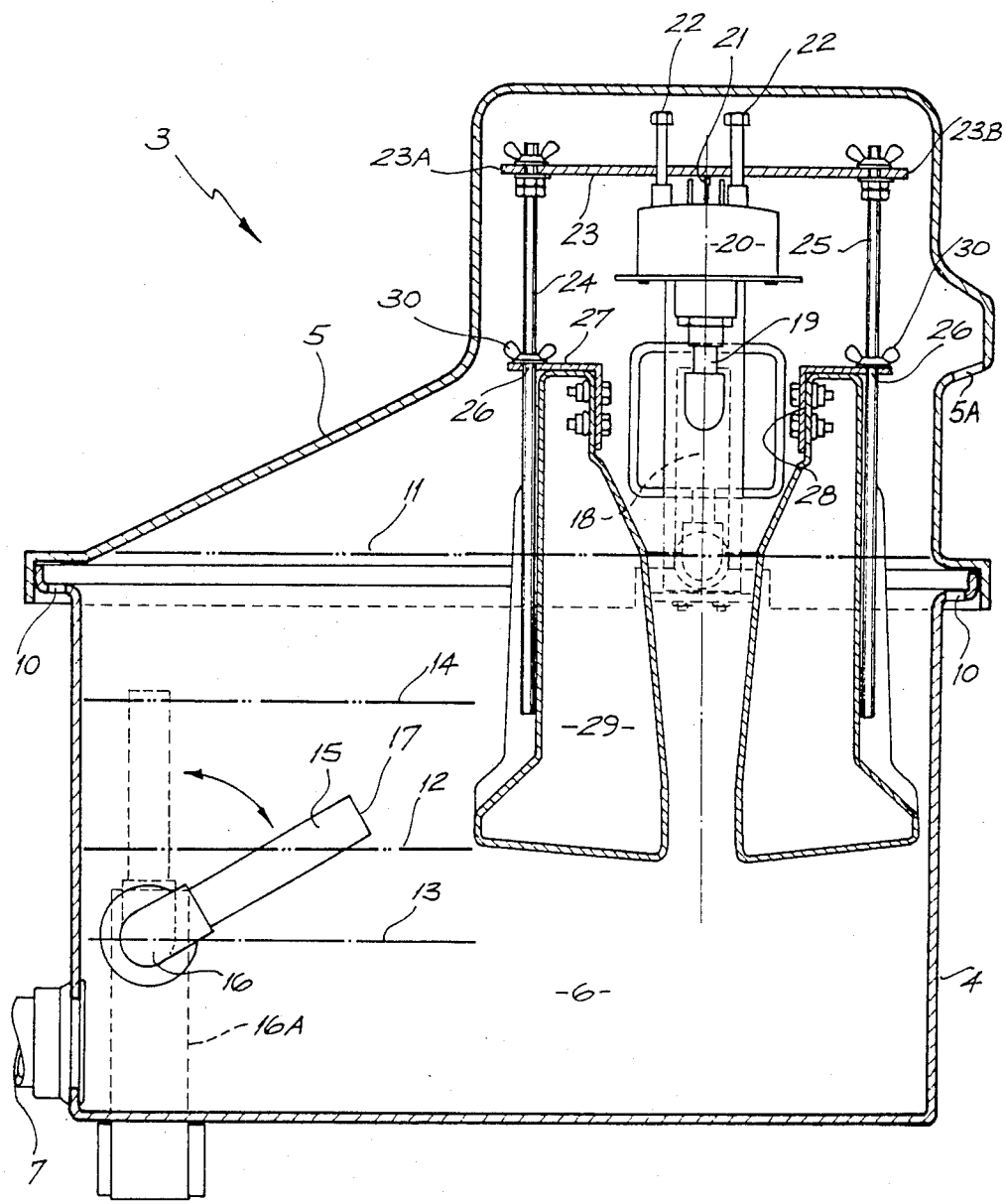
FIG. 2 is a sectional view through the monitoring chamber of the system.
Figure 3:
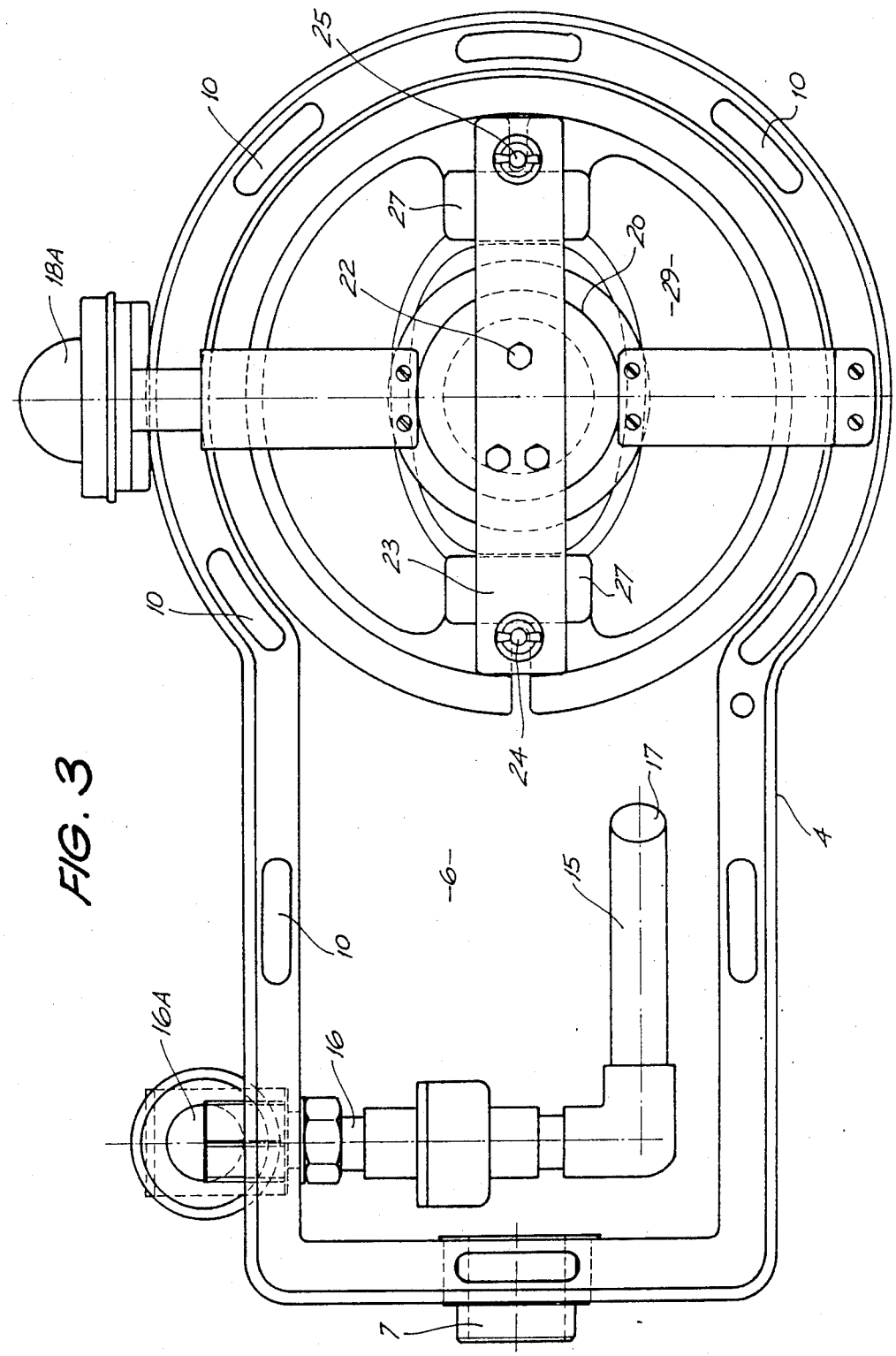
FIG. 3 is a plan view thereof with the cover removed.

The monitoring system of the invention as shown in FIG. 1 consists of a housing 3, preferably of plastics, having a base portion 4 set with its rim level with the pool spill level and a cover 5 which is removable for access to internal chamber 6 shown, in detail in FIG. 2. The cover 5 is provided with an airbreak orifice 5A (FIG. 2) conforming with the water authority's airbreak requirements. The housing 3 may be located at any convenient position on the domestic premises and is connected by water duct 7 from adjacent the bottom of the chamber 6 to a side wall of the swimming pool 8 which is well below the minimum water level maintained within the pool 8. A normal water level 9 is shown and, of course, any water level in the chamber 6 will always correspond to that in the pool 8. Overflow apertures 10 in the rim of the base portion 4 of the housing 3 are positioned at a level slightly below the pool spill level 11. Ideally, the water level 9 in the pool 8 will be maintained at the general water level 12, but depending upon personal choice it may be permitted to fluctuate between a low water level 13 and a high water level 14 (see FIG. 2) which to some extent will depend upon factors such as evaporation and rain fall. A rotatably adjustable overflow tube wherein one end 16 is connected to a drain 16A and its other open end 17 thereby displaceable between low and high water levels 13 and 14 is provided within the chamber 6. Its rotated position will be manually selected according to desired maximum water level within the pool 8. A fresh water mains pipe 18 complete with a visi-gauge flow indicator 18A penetrates a wall of the housing 3 at the side of the chamber 6 above the pool spill level 11 and an internal water line 19 is connected to the pipe 18 and fixed vertically with respect to the chamber 6. An overlying diaphragm valve 20 is connected to the upper end of the line 19 at a point well above the pool spill level 11. In a manner to be described below, water flow from the line 19 into the chamber 6 is controlled by the valve 20 which is of a type which passes abruptly from full-on to full-off water flow, i.e. of a snap-acting type. This type is preferable to a needle valve which tapers off the water supply when closing, as it will provide closer monitoring of water level.

Operation of the valve 20 is controlled by a plunger 21 in such a way that water is discharged from the bottom of the valve 20 when the plunger 21 is depressed a predetermined degree, and ceases when released. A pair of guide posts 22 mounted from the top of the valve 20 penetrate a rectangular actuator bar 23 which overhangs the valve 20 at its opposite ends 23A and 23B. Support rods 24 and 25 are secured at their upper ends to respective ends 23A and 23B of the actuator bar 23 and depend therefrom. The rods 24 and 25 are threaded at their lower ends and pass through holes 26 in an annular bracket 27 provided with a depending flange 28 at its inner periphery. An underslung, annular, buoyant float 29 at its upper end encircles at least the extended axis of the water line 19 and is secured at its upper end to the bracket 27. The level of the float 9 within the chamber 6 is adjustable by advancing threaded nuts 30 along the threaded lower ends of tne support rods 24 and 25. The purpose of providing the float 29 in annular form is to enable water discharged from the valve 20 to pass directly into the chamber 6, and also to assist in compactness of the system by encircling the line 19.

INDUSTRIAL APPLICABILITY

It will be seen, therefore, that by suitable adjustment of the level of the float 29 within the chamber 6 the water level within the chamber 6 as well as in the swimming pool 8 may be automatically maintained within close tolerances about a general water level predetermined by the level adjustment of the float 29 upon its support rods 24 and 25. Also, by suitable rotational adjustment of the overflow tube 15 draining of excessive rain water falling into the pool 8 will occur above the so selected maximum water level. A freeboard within the pool 8 may be thus maintained between say 250 ml and 50 ml with automatic maintenance of the water level to ±3 ml. Due to the underslung arrangement of the float 29 it becomes possible to produce a compact and completely enclosed unit with a removable lid 5 while still complying with prescribed requirements. The only moving assembly within the chamber 6 is the float 29 and actuating bar 23 which permits extremely accurate monitoring of the water level with a minimum of maintenance required.

Whereas a preferred embodiment has been described in the foregoing passages it should be understood that other forms, modifications and refinements are possible within the scope of the invention.

I claim:

1. A water level monitoring system for a water reservoir such as a swimming pool, comprising a chamber, a water duct for connecting said chamber and said reservoir to establish corresponding water levels therein, an adjustable overflow means positioned in said chamber for determining a desired water level for said reservoir, overflow aperture means positioned at a height above said overflow tube means for said chamber for allowing water flowing from said reservoir to said chamber to pass through said overflow aperture means when the water level in said chamber exceeds the desired water level and the amount of water flow is above that able to flow through said overflow means for limiting said water level to a maximum level within said reservoir, a fresh water inlet to said chamber connected by a substantially vertical water line to a diaphragm valve positioned above said maximum water level, an overhead actuator for said valve and an annular float in said chamber encircling at least the extended axis of said water line and supported adjustably in height within said chamber from opposite parts of said actuator to effect opening of said valve by said actuator with the water level falling below the desired water level to add fresh water to the chamber and thus to the reservoir to restore the water level to said predetermined level.

2. A water level monitoring system according to claim 1, wherein said adjustable overflow means is a tube having one end connected to a drain and being pivoted within said chamber to position its other end at a selected level above the drain between minimum and maximum desired water level limits.

3. A water level monitoring system according to claim 1 or 2, wherein said fresh water inlet is positioned above said maximum water level.

4. A water level monitoring system according to claim 1, 2 or 3, wherein said valve has an operating plunger, guide post means are supported by said valve, and said overhead actuator is a bar vertically slideable upon said guide post means to depress said plunger and operate said valve with said falling water level within said chamber.

5. A water level monitoring system according to claim 4, wherein said adjustable support for said float comprises rods depending from opposite end portions of said bar with nuts screwed upon threaded lower portions thereof which carry said float along said rods for adjustment.

6. A water level monitoring system according to any one of the preceding claims, wherein said diaphragm valve is of snap-acting form to enable it to pass abruptly from full-on to full-off water flow.

7. A water level monitoring system according to claim 6 wherein said valve discharges water from beneath into the centre of the annular float whenever said valve is open.

* * * * *